United States Patent
Critz et al.

[11] Patent Number: 6,037,075
[45] Date of Patent: *Mar. 14, 2000

[54] ELECTRICALLY NON-CONDUCTIVE PLATE STRUCTURES AND HIGH PRESSURE ELECTROCHEMICAL CELL DEVICES EMPLOYING SAME

[75] Inventors: Kurt M. Critz, Enfield; Andrei Leonida, West Hartford, both of Conn.; Robert J. Roy, West Springfield, Mass.

[73] Assignee: United Technologies Corporation, Hartford, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/753,540

[22] Filed: Nov. 26, 1996

[51] Int. Cl.[7] .................................................. H01M 8/04
[52] U.S. Cl. .............................. 429/36; 429/38; 204/265
[58] Field of Search ................................. 429/30, 34, 36, 429/38, 41, 44, 234; 204/290, 265

[56] References Cited

U.S. PATENT DOCUMENTS

| | | |
|---|---|---|
| 1,183,807 | 5/1916 | Everett . |
| 1,380,962 | 6/1921 | Holland . |
| 1,380,963 | 6/1921 | Holland . |
| 3,206,332 | 9/1965 | Juda . |
| 3,372,060 | 3/1968 | Platner . |
| 3,692,585 | 9/1972 | Mayo . |
| 3,814,631 | 6/1974 | Warszawski et al. . |
| 4,274,939 | 6/1981 | Bjareklint . |
| 4,410,410 | 10/1983 | Deborski . |
| 4,585,527 | 4/1986 | Northway et al. . |
| 4,751,153 | 6/1988 | Roth ........................................ 429/35 |
| 4,892,632 | 1/1990 | Morris ..................................... 204/128 |
| 5,268,239 | 12/1993 | Roche . |
| 5,270,129 | 12/1993 | Ishida . |
| 5,296,109 | 3/1994 | Carlson et al. . |
| 5,316,644 | 5/1994 | Titterington et al. . |
| 5,342,706 | 8/1994 | Marianowski et al. . |
| 5,366,823 | 11/1994 | Leonida et al. . |
| 5,441,621 | 8/1995 | Molter et al. ......................... 204/252 |
| 5,466,354 | 11/1995 | Leonida et al. . |
| 5,578,388 | 11/1996 | Faita et al. ............................. 429/30 |
| 5,580,672 | 12/1996 | Zagaja, III et al. ..................... 429/13 |
| 5,660,941 | 8/1997 | Farooque et al. ....................... 429/19 |

FOREIGN PATENT DOCUMENTS

| | | |
|---|---|---|
| 0690519A | 1/1996 | European Pat. Off. . |
| 0774794A | 5/1997 | European Pat. Off. . |
| 55-056373A | 6/1980 | Japan . |
| 55-096570A | 10/1980 | Japan . |
| WO9222096 | 12/1992 | WIPO . |

*Primary Examiner*—Stephen Kalafut
*Attorney, Agent, or Firm*—Mark R. Bonzagni, Esq.; Holland & Bonzagni, P.C.

[57] ABSTRACT

An electrically non-conductive plate structure, for use in high pressure electrochemical cells employing ion-exchange membranes that creep or flow under pressure, is provided. Such plate structures are provided with a means for impeding membrane creep or flow when the cells are subjected to high axial loadings. When two such structures are positioned on either side of an ion-exchange membrane, so as to forcibly contact the surfaces thereof, such structures serve to contain, and thereby form a fluid tight seal with, the membrane while maintaining the electrical integrity of the cell.

25 Claims, 3 Drawing Sheets

ELECTRICALLY NON-CONDUCTIVE PLATE STRUCTURES AND HIGH PRESSURE ELECTROCHEMICAL CELL DEVICES EMPLOYING SAME

FIELD OF THE INVENTION

The present invention relates to electrochemical cell devices and, more particularly, relates to high-pressure electrochemical cell devices utilizing ion-exchange membranes that demonstrate improved adhesion between cell components and reduced membrane creep when the devices are subjected to high axial loadings.

BACKGROUND OF THE INVENTION

Electrochemical cell devices are known. These devices are typically made up of a plurality of electrochemical cells, arranged in groups or stacks, and basically serve to either: electrolytically disassociate water or another liquid into its components (i.e., electrolysis cells), or catalytically combine hydrogen or other gaseous fuel and oxygen (i.e., fuel cells), with electricity being either supplied or generated, respectively.

Each electrochemical cell, regardless of its intended use, includes an anode cavity and electrode plate, a cathode cavity and electrode plate, and an electrolyte (which can be any ionically conductive material such as an ion-exchange membrane or liquid contained in a porous matrix) positioned between at least the active area of the electrode plates. The membrane or porous matrix typically has a catalyst layer located on opposing surfaces to facilitate or enhance the electrochemical reaction.

The preferred stacking arrangement or configuration for both electrolysis and fuel cells is hydraulically in parallel, by means of fluid headers and cell manifolds, and electrically in series, by providing a full electrical path along the stacking direction. When these cells are arranged in a group or a stack, fluid cavities are defined by the electrode/electrode plate interface with the membrane on one side and a solid separator sheet at the opposite side. Bipolar assemblies are possible by joining two complementary fluid cavities at the separator sheet interface. General purpose bipolar assemblies typically contain the following sequence of components: electrolyte, electrode, electrode plate, fluid cavity with cell manifolds, separator plate, pressure pad or compensating component, separator plate, fluid cavity with cell manifolds, electrode plate, electrode, and electrolyte from the adjacent cell. Where each component has dimensional tolerances, a compensating component is useful for such multi-component hardware assemblies. As is well known to those skilled in the art, a certain degree of compression is desirable to ensure good electrical conductivity between the different components or parts in contact. This can be achieved by adjusting the overall compression loading during stack assembly. However, when the stack operating conditions are such that it could oppose the contact force, an elastic component such as a pressure pad is typically employed to maintain the minimum contact pressure required during operation. In most instances, the pressure pad also serves to compensate for the dimensional tolerances of the cell components.

Electrochemical cell assemblies or devices, especially those devices utilizing ion-exchange membranes, are best suited to be operated at very high, super-atmospheric pressures. As is well known in the art, when external pressure equalization measures are not employed during the operation of such devices, the resultant pressure differentials both within the cell and between the interior and the exterior of the electrochemical cell device impose considerable strain on the internal cell components in the cell active area and on the peripheral portions of the individual cells. In addition, high demands are placed on the fluid impermeability of the various components of the device and the interfaces therebetween. Where pressure equalization measures typically add to the complexity and cost of the equipment in addition to increasing the overall dimensions and weight of the equipment, the employment of such measures is not always feasible. Accordingly, and in addition to the pressure pad described above, means for accommodating or meeting the demands of such high-pressure operation within the cell itself have been developed for both "overboard" and "cross-cell" high pressure operation.

By way of explanation, since the cell itself contains two fluid cavities, any one or both of them could be operated at above-ambient pressure. The "overboard" pressure capability refers to a cell assembly with both fluid cavities being at essentially the same pressure above ambient. In this operating mode, there is relatively little stress imposed on the electrolyte cell component and it is the only way a cell using liquid electrolyte contained in a porous matrix could be used. Conversely, the "cross-cell" pressure capability refers to a cell assembly where one fluid cavity is at a substantially higher pressure than the other. In this operating mode, stress is exerted across the electrolyte cell component in direct proportion to the pressure difference between the two fluid cavities. "Cross-cell" pressure capability of porous matrix electrolyte structures is typically in the range of 1 kilopascal (kPa) while, properly supported polymer membrane electrolyte structure is currently capable of more than 21 megapascals (MPa) across the cell.

In particular regard to high-pressure electrochemical cell devices employing ion-exchange membranes, the anode and cathode electrode plates of such devices are usually made up of at least two plate-shaped components and are used in conjunction with finer mesh screens and/or porous sheets, that lend additional support to the membrane while allowing easy material access to and from the electrode. These high-pressure cell components are basically constructed to include a solid, fluid impervious frame of a suitable shape and size and a fluid pervious central portion bounded by the frame. The frame of each component includes a plurality of through apertures or slots. Upon assembly of a unit cell, such apertures or slots are aligned so as to collectively constitute fluid supply and discharge flow paths or manifolds. In addition, the frame of the plate-shaped components of the electrode plates contain channels that serve to connect the through apertures or slots and the fluid pervious central portion.

U.S. Pat. No. 5,316,644 to Titterington et al., which is incorporated herein by reference, discloses an improved electrochemical cell electrode plate preferably made up of at least two plate-shaped components. As described above, each component has a fluid pervious central portion and a solid frame, circumferentially surrounding the central portion, and provided with at least one through aperture. The frame is also provided with a plurality of rows of separate slots, with the slots of one of the two components partially overlapping those of the other component so as to form a passage connecting the through apertures or slots and the central portions that dictates a tortuous path. (See, Col. 4, lines 21 to 26.)

The fluid pervious central portion or active area of each plate-shaped component of the improved electrode plate of Titterington et al. constitute a mesh or network of diamond-shaped openings. The plate-shaped components are stacked with the long dimensions of the diamonds at 90° angles relative to each other. However, it has been observed that large, through openings, formed as a result of this stacking technique, leave adjacent cell components essentially unsupported in areas.

Porous sheets are employed as fluid permeable mechanical supports in high-pressure electrochemical cell devices to prevent the ion-exchange membrane from extruding, under the stress caused by the "cross-cell" pressure, into an adjacent screen located on the side of the membrane having the lower pressure, which would cause electrolyzer failure. U.S. Pat. No. 5,296,109 to Carlson et al., which is also incorporated herein by reference, discloses an improved water electrolyzer that employs such a porous sheet. In particular, Carlson et al. disclose the use of a porous metal membrane support, having multiple pore sizes, with a water electrolyzer. The porous membrane supports can be interposed between the anode electrode plate, the cathode electrode plate, or both, and the fine mesh screens. These membrane supports are typically prepared by powder metal sintering.

The operating pressure, whether "overboard" or "cross-cell", opposes the initial compression load imposed on a stack assembly. As is well known, good electrical conductivity requires that a minimum contact pressure is maintained at all times. As set forth hereinabove, an elastic component, commonly referred to as a compression or pressure pad, is included in an electrochemical cell assembly in order to effect uniform contact pressure over the entire active area of the anode and cathode electrode plates and to compensate for variations in dimensional tolerances. Related patents U.S. Pat. No. 5,366,823 and U.S. Pat. No. 5,466,354, both to Leonida et al., which are incorporated herein by reference, disclose an improved compression pad described as a high-pressure compatible, electrically conductive porous metal pad useful in maintaining uniform contact at cell operating pressures above 10.34 megapascals (MPa). The porous metal pad (e.g., nickel felt pressure pad) has sufficient porosity to attain an elastic strain of from about 3% to about 40% at a pressure of about 17.24 MPa.

The most commonly used commercially available ion-exchange membranes are NAFION® perfluorocarbon sulfonic acid membranes, produced by E.I. DuPont de Nemours and Co., Inc. of Wilmington, Del. These membranes are used for high pressure electrochemical cells because of their chemical stability. However, NAFION® membranes are an ionically conductive derivative of TEFLON® perfluoroalkoxy (PFA) resins and, like the majority of materials in this category, will creep or flow under a constant load.

It has been found that, even when the above-described electrode plates, finer mesh screens, porous sheets, and compression pads are employed in high-pressure electrochemical cell devices, membrane creep still occurs at high loads, which can result in high-pressure fluid leaks and/or loss of electrical isolation across the cell(s).

In fabricating high-pressure electrochemical cell devices, bonding materials are typically thinly applied to the solid frame or sealing surfaces of the cell components that have been pre-treated to enhance adhesion. The components are then assembled and the resulting assembly laminated by subjecting it to elevated temperatures and pressures.

It has been observed, however, that the thinly applied bonding materials of such laminated assemblies form grainy coatings with many microscopic voids.

Accordingly, it is a general object of the present invention to avoid the above-referenced disadvantages of the prior art.

More particularly, it is an object of the present invention to provide a high-pressure electrochemical cell device that is capable of successfully operating at extremely high pressures for long periods of time.

It is a more particular object to provide a high-pressure electrochemical cell device that demonstrates reduced membrane creep or flow when subjected to high axial loadings and that demonstrates improved adhesion between cell components.

It is an even more particular object to provide an electrically non-conductive plate structure or grip sheet that effects such reduced membrane creep or flow.

SUMMARY OF THE INVENTION

The present invention therefore provides an electrically non-conductive plate structure or grip sheet, for use in high pressure electrochemical cells employing ion-exchange membranes that creep or flow under pressure, that has a first and a second surface, a central bore, and at least one through aperture that opens onto the first and second surfaces.

The grip sheet is provided with a means for impeding membrane creep or flow when the cells are subjected to high axial loadings.

When the first surface of one such grip sheet forcibly contacts a first surface of an ion-exchange membrane employed in a high pressure electrochemical cell and when the first surface of another such grip sheet forcibly contacts a second surface of the membrane, the grip sheets alone and collectively serve to contain, and thereby form a fluid tight seal with, the membrane.

The present invention further provides a high pressure electrochemical cell that utilizes at least one ion-exchange membrane that creeps or flows under pressure and that comprises at least two grip sheets, as described hereinabove.

The foregoing and other features and advantages of the present invention will become more apparent from the following description and accompanying drawings.

BEST MODE FOR CARRYING OUT THE INVENTION

Figure 1:
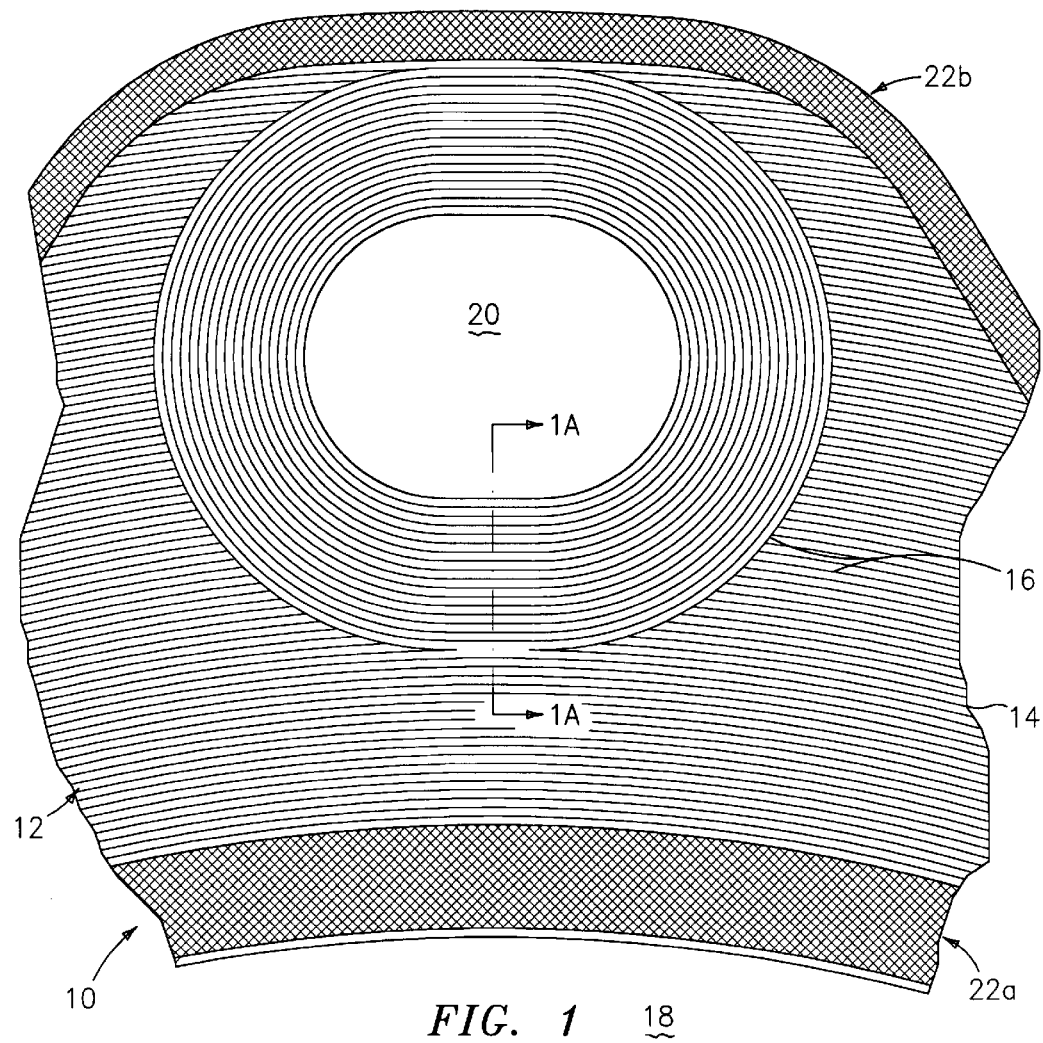
FIG. 1 is a top plan view, at an enlarged scale, of a section of a preferred plate structure or grip sheet of the present invention.

The electrically non-conductive plate structures or grip sheets of the present invention serve to seal and contain the electrolyte membranes employed in high-pressure electrochemical cell devices. As set forth hereinabove, NAFION® perfluorocarbon sulfonic acid membranes, because of their chemical stability, are the membranes most commonly used in high pressure electrochemical cells. However, these membranes are an ionically conductive derivative of TEFLON® PFA resins and, like the majority of materials in this category, will creep under a constant load. Use of the present inventive grip sheets in conjunction with such membranes in high pressure electrochemical cells effects gas sealing and greatly reduced membrane creep.

In such high pressure electrochemical cell devices, each membrane is positioned between first surfaces of two grip sheets, with each grip sheet belonging to one of two consecutive cells. As will be readily understood by those skilled in the art, each grip sheet represents a layer in direct contact with the sealing area of the respective membrane.

The grip sheet of the present invention has a first and a second surface, a central bore and at least one through aperture that opens onto the first and second surfaces. The grip sheet is preferably made of a metallic material to ensure a very high mechanical strength. The metallic material is chosen so as to be compatible with the membrane being employed in an electrolytic cell and is later treated so as to improve on the grip sheet's dielectric properties. Suitable metallic materials include niobium, titanium, zirconium and stainless steel. Of these metallic materials, niobium, titanium and zirconium are compatible with NAFION® membranes. Stainless steel is compatible with non-functional cells such as cells that are not charged anodically. The thickness of the present inventive grip sheet preferably ranges from about 0.03 to about 0.40 millimeters (mm).

The inventive grip sheet is provided with a means for impeding membrane creep or flow when the cell device is subjected to high axial loadings. Such means serve to interfere with the membrane's tendency to flow and takes the form of a pattern designed to contain this highly viscous fluid.

In a preferred embodiment, the sealing area of the first surface of the grip sheet is provided with either a screen pattern or a raised pattern. Due to the high axial loading typically needed to seal an electrochemical cell device during high pressure operation and the creep characteristics of the membranes, a layer in direct contact with the sealing areas of these membranes, if flat or plain, would facilitate an electrical short.

In particular, the grip sheet of the present invention may be provided with a screen pattern (e.g., diamond pattern) that extends through the structure from the first surface to the second surface with a solid border being provided around the aperture(s) and the central bore. The screen pattern preferably has a mesh size ranging from about 2 to about 6.

Alternatively, the sealing area of the first surface of the grip sheet may be provided with a raised pattern. As best shown in FIG. 1, the grip sheet of the present invention, which is generally referred to by reference numeral 10, is provided with a first surface 12 having a sealing area 14. Sealing area 14 is, in turn, provided with concentric ridges 16. Concentric ridges 16 separately surround, without a break, central bore 18 and aperture(s) 20. A border 22a,b may advantageously be employed about the central bore 18 as well as about the outer peripheral region of surface 12.

Figure 1A:
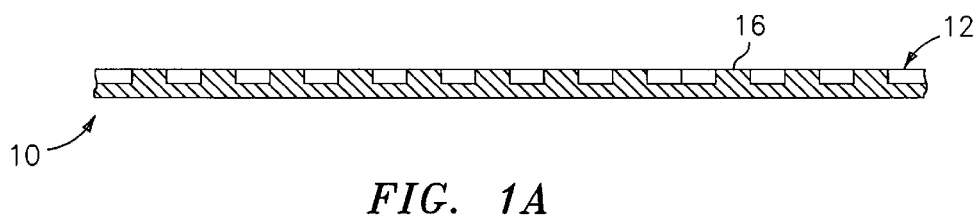
FIG. 1A is a partial cross-sectional view of the grip sheet of FIG. 1 taken along line 1A.

FIG. 1A, which represents a partial cross-sectional view of the grip sheet of FIG. 1, taken along line 1A, shows concentric ridges 16 formed in first surface 12 of grip sheet 10.

Figure 2:
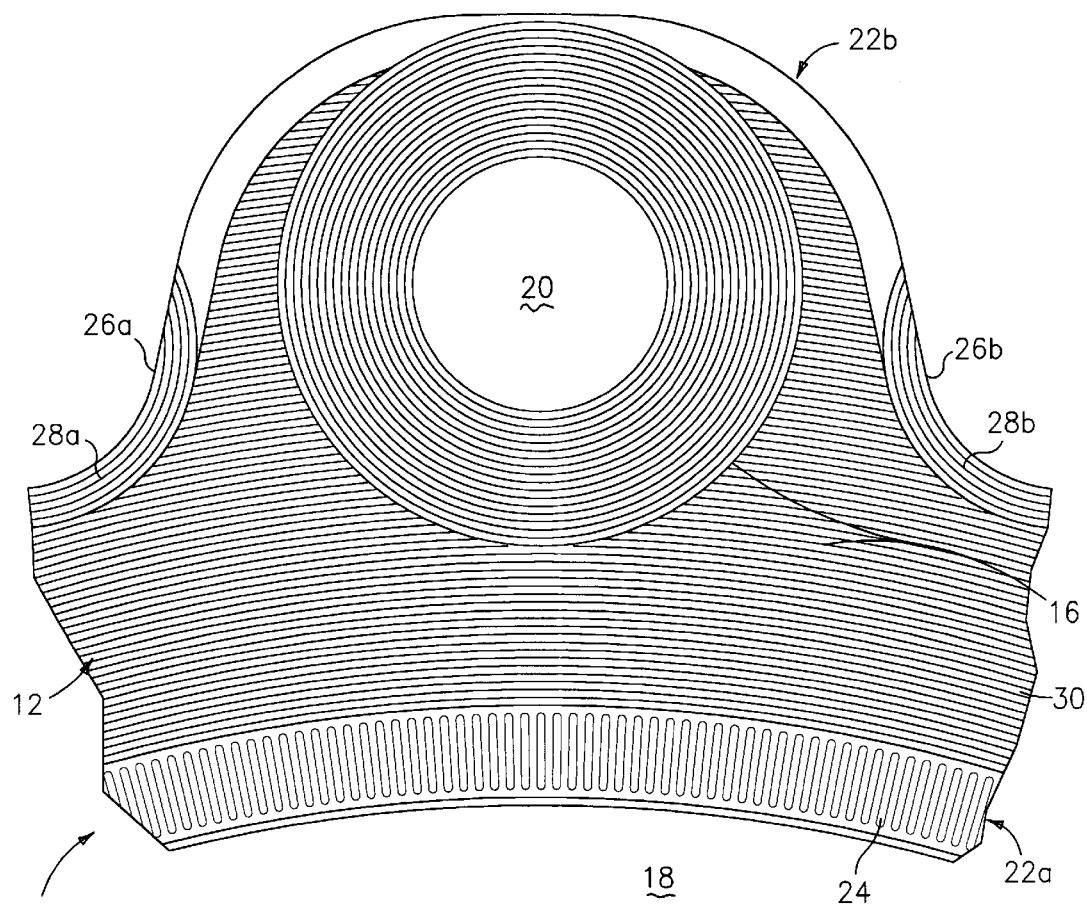
FIG. 2 is a top plan view at an enlarged scale, of a section of a more preferred grip sheet of the present invention.

In a more preferred embodiment, border 22a,b of grip sheet 10 is also provided with a raised pattern. As best shown in FIG. 2, border 22a is provided with ridges 24 that are oriented radially while concave areas 26a,b of border 22b are provided with curved ridges 28a,b.

In a more preferred embodiment, the open area ratio of the cross section ranges from about 30% to about 70%. In other words, the height and width of each concentric ridge 16 ranges from about 0.01 to about 0.04 mm and from about 0.10 to about 0.40 mm, respectively, while the width of groove 30, located between the ridges 16, ranges from about 0.10 to about 0.40 mm.

The screen pattern or raised pattern of grip sheet 10 of the present invention can be prepared by any number of techniques, including the use of forming processes such as stamping and punching and by way of material removing techniques that may advantageously entail etching, such as photoresist assisted or laser assisted etching. It is preferred that etching techniques be employed where such techniques do not result in residual stresses in the material after manufacturing.

Once the screen pattern or raised pattern is prepared, preferred subsequent processing steps performed on grip sheet 10 include abrading sealing area 14 and the second surface by any suitable method that serves to roughen the surfaces so as to enhance adhesion of subsequent adhesive coatings. Such methods include post-etching in spent etchant, and vapor blasting. Grip sheet 10 is then preferably cleaned using standard cleaning techniques.

In order to improve on the dielectric properties of the grip sheet 10, the structure is provided with a passivating or surface oxide layer by anodizing the structure at about 80 to 90 Vdc in a neutral saline solution or by heating in air, depending upon the material making up grip sheet 10. The former method is preferred for zirconium, niobium and titanium. In this preferred method, the grip sheet 10 with a conventional attachment tab, is slid into a center rail contained in an anodizing bath containing a neutral saline solution and cathode screens that are equidistant from the bath center rail. The saline solution covers grip sheet 10 in its entirety except for the attachment tab that extends from the surface of the solution. One end of an electrical lead is attached to the tab and the other end to a positive terminal of a 0–10 amp., 0–120 Vdc power supply. A second electrical lead is attached to each of the cathode screens, with the other end attached to a negative terminal of the power supply. The potential is then slowly increased to 80–90 Vdc and maintained at this potential until the current to grip sheet 10, as measured by a digital ammeter, drops to less than 10 mA. Anodized grip sheet 10 is then removed from the bath, rinsed in deionized water and air dried. As a result, the grip sheet 10, except for those grip sheets prepared from stainless steel, form a dense, adherent oxide coating that serves as a dielectric insulator. Stainless steel can be chemically passivated or treated in air at approximately 400° C. to form a non-conducting oxide layer.

Once the passivating layer is formed on the grip sheet 10, an electrically insulating elastomeric coating is applied to the passivating layer prior to assembly. The elastomeric coating serves to adhere grip sheet 10 to the membrane and to a contiguous plate-shaped cell component and includes fluoropolymer, ceramic, and epoxy-based coatings. In a preferred embodiment, a first catalyst coating comprising from about 3 to about 15% by volume of a cross-linking organic silicone oligomer catalyst and from about 85 to about 97% by volume methyl ethyl ketone or methyl isobutyl ketone, is sprayed onto sealing area 14 and allowed to dry for up to 5 minutes. A second fluoroelastomeric coating comprising from about 5 to about 25% by volume of a fluoropolymer, from about 0.5 to about 5% by volume of a cross-linking organic silicone oligomer catalyst, and from about 70 to about 95% by volume methyl ethyl ketone or methyl isobutyl ketone is then sprayed onto coated sealing area 14 and onto the uncoated second surface. The second fluoroelastomeric coating is allowed to air dry for at least 1 hour prior to final cure. The cross-linking catalyst and the fluoropolymer are available from Lauren Manufacturing Co., 2228 T Reiser Ave., S.E., New Philadelphia, Ohio 44663, under the trade designations CA-20 and LCGY-8125, respectively. Water based formulations with similar properties and characteristics are also available from the same supplier. The use of the subject coatings produces a hard adherent coating on grip sheet 10.

The high pressure electrochemical cell of the present invention basically comprises an anode cavity and electrode plate, a cathode cavity and electrode plate, an electrolyte positioned between at least the active areas of the electrode plates and two grip sheets located on either side of the electrolyte.

In preparing the high pressure electrochemical cell of the present invention it is preferred that assembly be performed in two steps. In particular, subassemblies, made up of slotted and unslotted parts, respectively, are assembled and laminated. The laminated subassemblies are then assembled and compressive force concentrated solely on the coated areas of the subassemblies. Once the subassemblies are laminated together, the finished part is pressed between very flat plates to assure complete setting of the component parts in the active area.

In addition to the above description, the grip sheets and high pressure electrochemical cells of the present invention are further developed by reference to the illustrative, but not limiting examples set forth below.

WORKING EXAMPLES

In the Working Examples set forth below grip sheets of various thicknesses and designs along with anodized grip sheets, employing standard fluoroelastomeric coatings and optionally, catalytic coatings, were tested for their ability to seal and contain an electrolyte membrane and for their ability to maintain the electrical integrity of a host cell assembly.

In the Working Examples, the following components were used:

STANDARD FLUOROELASTOMERIC COATING—A fluoroelastomeric coating composition comprising a two-part mixture of:

- a fluoropolymer composition, sold by Lauren Manufacturing, under the trade designation FLUOROLAST LCGY-8125 high performance fluoroelastomeric coating, and containing a fluoropolymer, fillers (i.e., carbon black and titanium dioxide), and solvent (i.e., methyl ethyl ketone and methyl isobutyl ketone); and
- a catalyst composition, also sold by Lauren Manufacturing, under the trade designation CA-20 high performance coating, and containing a cross-linking agent for the fluoropolymer (i.e., an organic silicone oligomer) and solvent (i.e., methyl ethyl ketone and methyl isobutyl ketone).

The two components were mixed in a ratio of 1 ml of CA-20 for every 20 ml of FLUOROLAST LCGY-8125, and then diluted with 90 ml of methyl isobutyl ketone to render a 19% solution.

CATALYTIC COATING—A solution of 1 ml CA-20 diluted with 10 ml of methyl isobutyl ketone to render a 10% solution.

Sample Preparation

Three types of grip sheets (Group I) were fabricated and coated with the CATALYTIC COATING and the STANDARD FLUOROELASTOMERIC COATING and then placed in a single cell laminate assembly for the purpose of testing these devices for their ability to seal and contain an electrolyte membrane.

Three types of grip sheets (Group II) were fabricated, anodized and coated with the STANDARD FLUOROELASTOMERIC COATING and, optionally, also with the CATALYTIC COATING and placed within a host cell assembly for the purpose of testing these devices for their ability to maintain the electrical integrity of the assembly.

Group I Grip Sheet Preparation

Two 0.05 mm thick grip sheets and two 0.075 mm thick grip sheets, each having a central bore measuring 13 cm in diameter, four apertures equally spaced outside the central bore and having an area of 1 $cm^2$ and a sealing area provided with a diamond-shaped screen pattern having a mesh size of 1.5 mm×3.0 mm were prepared by photochemically etching 0.05 mm and 0.075 mm thick stainless steel metal foils, using a ferric chloride solution.

The sealing surface of each etched sheet was then abraded by vapor blasting to a matte finish. Each vapor blasted sheet was then cleaned by: rinsing the part in distilled water and vapor degreasing the part followed by ultrasonic cleaning, re-rinsing in distilled water and air drying. The grip sheets were then sprayed with the CATALYTIC COATING with an air brush operating with clean nitrogen as the carrier gas. The resulting coating was allowed to dry for 5 minutes and a coating of the STANDARD FLUOROELASTOMERIC COATING was then sprayed onto each grip sheet to a thickness of 0.013 mm and allowed to dry for 1 hour.

Two 0.05 mm thick grip sheets each having a central bore measuring 13 cm in diameter, four apertures equally spaced outside the central bore and having an area of 1 $cm^2$, and a sealing area provided with a raised concentric ridge pattern were also prepared by photochemically etching 0.05 mm thick stainless steel metal foils using a ferric chloride solution. The raised concentric ridge pattern separately surrounded, without a break, the central bore and the four apertures on one side of the grip sheets. The height and width of each concentric ridge measured 0.013 mm and 0.25 mm respectively, while the width of each groove, located between the ridges, measured 0.25 mm.

The etched grip sheets were then processed as described above.

Group I Grip Sheet Single Cell Assembly Preparation

Three single cell assemblies or test articles, each employing a different set of Group I grip sheets, were prepared for use in conducting the Overboard Sealing Performance Test, as detailed below. Each cell assembly contained the following sequence of components:

- an oxygen end assembly made up of: an etched stainless steel end separator frame devoid of manifolds and slots; two etched stainless steel $O_2$ screen frames or electrode plates with manifolds and slots; an etched stainless steel $O_2$ membrane screen with manifolds but no slots; and a Group I grip sheet with manifolds or apertures but no slots;
- a platinized NAFION® 117 membrane;
- a hydrogen end assembly made up of: a Group I grip sheet with manifolds but no slots; a 0.15 mm sintered titanium powder porous sheet; two 0.075 mm 5/0 niobium screens; an etched stainless steel porous plate frame with manifolds and no slots; an etched stainless steel $H_2$ porous plate frame with manifolds and slots; two $H_2$ screen frames or electrode plates with manifolds and slots; and an etched stainless steel separator frame with manifolds but no slots; and a stainless steel fluid plate.

The assembled test articles were separately loaded in an hydraulic pressure cart and compressed to approximately 178,000 N. The hydraulic pressure cart was made up of: an hydraulic pump manufactured by Enerpac, 13000 W. Silver Spring Drive, Butler, Wis. 53007, and having a model number P-80; two hydraulic hollow cylinders, also manufactured by Enerpac, and having a model number RCH-302; 10 cm×10 cm aluminum support bars; 2.5 cm in diameter high strength steel threaded rods and nuts; and aluminum rams having a diameter of 15 cm.

Group II Grip Sheet Preparation

Two 0.075 mm thick screen pattern grip sheets, having the same requisite geometry as described above for the Group I screen pattern grip sheet, were prepared by photochemically etching 0.075 mm thick niobium metal foils using a solution containing hydrofluoric and nitric acids followed by abrading the sealing surfaces and cleaning the etched and abraded parts as provided above for the Group I grip sheets. The cleaned parts were then separately anodized by sliding the part having an attachment tab adhered thereto into a central rail of an anodizing bath. The bath was comprised of a high density polyethylene material and contained a buffer solution of pH=7.0 and two stainless steel cathode screens positioned equidistant from the central rail. The buffer solution covered the entire part except for the attachment tab. One end of an electrical lead was attached to the tab and the other end was attached to a positive terminal of a 0–10 amp., 0–120 Vdc power supply. A second lead was attached to each of the cathode screens and the other end was attached to a negative terminal of the power supply. The potential was then slowly increased to 80–90 Vdc and maintained at this potential until the current to the part dropped to less than 10 mA. The current to the part was monitored during each potential increase to insure that the current to the part did not exceed 3 amps to limit temperature rise during the process. The current and voltage to the part were monitored by a digital multimeter. The anodized part was then removed from the bath, rinsed in deionized water and air dried. The anodized screen pattern grip sheets were then sprayed with the STANDARD FLUOROELASTOMERIC COATING. The resulting coating, that had a thickness of 0.013 mm, was allowed to dry for 1 hour.

Two 0.05 mm thick raised concentric ridge pattern grip sheets, having the same requisite geometry described above for the Group I raised pattern grip sheet, were prepared by photochemically etching 0.05 mm thick niobium metal foils using the above-referenced acidic solution followed by abrading the sealing surfaces and cleaning the etched and abraded parts as provided above for the Group I grip sheets. The cleaned parts were then anodized according to the procedure detailed above and then sprayed with the STANDARD FLUOROELASTOMERIC COATING. The resulting coating, that had a thickness of 0.013 mm, was allowed to dry for 1 hour.

Ten 0.05 mm thick raised concentric ridge pattern grip sheets, each having the same requisite geometry described above for the Group I raised pattern grip sheet, were prepared by photochemically etching 0.05 mm thick niobium, titanium and zirconium metal foils using the above-referenced acidic solution followed by abrading the sealing surfaces and cleaning the etched and abraded parts as provided above for the Group I grip sheets. The cleaned parts were then anodized according to the procedure detailed above and then sprayed with the CATALYTIC COATING. The resulting coating was allowed to dry for 5 minutes and a coating of the STANDARD FLUOROELASTOMERIC COATING was then sprayed onto each grip sheet to a thickness of 0.013 mm, and allowed to dry for 1 hour.

Group II Grip Sheet Cell Assembly Preparation

Two single cell assemblies, one two-cell assembly and one three-cell assembly, each employing a different set of Group II grip sheets, were prepared for the purpose of testing these devices for lifetime or endurance. The cell assemblies contained the following sequence of components:

Test Article 1.

an end plate;

an electrical insulator;

a copper positive terminal;

an oxygen end assembly made up of: an etched niobium end separator frame devoid of manifolds and slots; two etched niobium $O_2$ screen frames or electrode plates with manifolds and slots; an etched niobium $O_2$ membrane screen with manifolds but no slots; and a Group II grip sheet with manifolds or apertures but no slots;

a platinized NAFION® I 117 membrane with appropriate electrodes attached;

a hydrogen end assembly made up of: a Group II grip sheet with manifolds but no slots; a 0.30 mm sintered zirconium powder porous sheet or plate; an etched niobium porous plate frame with manifolds but no slots; an etched niobium porous plate frame with manifolds and slots; two etched niobium $H_2$ screen frames or electrode plates with manifolds and slots; an etched niobium separator frame with manifolds but no slots;

a 0.23 mm sintered nickel felt compression pad;

an etched niobium porous plate frame with manifolds but no slots; and a fluid plate.

Test Article 2.

an end plate;

an electrical insulator;

a copper positive terminal;

an oxygen end assembly made up of: an etched niobium end separator frame devoid of manifolds and slots; three etched niobium $O_2$ screen frames or electrode plates with manifolds and slots; a 0.25 mm sintered titanium powder porous sheet or plate; an etched niobium porous plate frame with manifolds but no slots; and a Group II grip sheet with manifolds or apertures but no slots;

a platinized NAFION® 117 membrane with appropriate electrodes attached;

a hydrogen end assembly made up of: a Group II grip sheet with manifolds but no slots; an etched niobium $H_2$ membrane screen with manifolds but no slots; two etched niobium $H_2$ screen frames or electrode plates with manifolds and slots; an etched niobium separator frame with manifolds but no slots;

a 0.36 mm sintered zirconium powder compression pad;

an etched niobium porous plate frame with manifolds but no slots; and a fluid plate.

Test Article 3.

an end plate;

an electrical insulator;

a copper positive terminal;

an oxygen end assembly made up of: an etched titanium end separator frame devoid of manifolds and slots; four etched niobium $O_2$ screen frames or electrode plates with manifolds and slots; a 0.25 mm sintered titanium powder porous sheet or plate; an etched titanium porous plate frame with manifolds but no slots; and a Group II grip sheet with manifolds or apertures but no slots;

a platinized NAFION® 117 membrane with appropriate electrodes attached;

a bipolar assembly made up of: a Group II grip sheet with manifolds but no slots; an etched zirconium $H_2$ membrane screen with manifolds but no slots; two etched zirconium $H_2$ screen frames or electrode plates with manifolds and slots; an etched zirconium separator frame with manifolds but no slots; a 0.25 mm sintered nickel felt compression pad; an etched titanium porous plate frame with manifolds but no slots; an etched titanium separator frame with manifolds but no slots; four etched titanium $O_2$ screen frames or electrode plates with manifolds and slots; a 0.25 mm sintered titanium powder porous sheet or plate; an etched titanium porous plate frame with manifolds but no slots; and a Group II grip sheet with manifolds but no slots;

a platinized NAFION® 117 membrane with appropriate electrodes attached;

a hydrogen end assembly made up of: a Group II grip sheet with manifolds but no slots; an etched zirconium $H_2$ membrane screen with manifolds but no slots; two etched zirconium $H_2$ screen frames or electrode plates with manifolds and slots; an etched zirconium separator frame with manifolds but no slots;

a 0.25 mm sintered nickel felt compression pad;

an etched titanium porous plate frame with manifolds but no slots;

an etched titanium separator frame with manifolds but no slots;

a support plate; and a fluid plate.

Test Article 4.

an end plate;

an electrical insulator;

a copper positive terminal;

an oxygen end assembly made up of: a 0.30 mm sintered nickel felt compression pad; an etched niobium porous plate frame devoid of manifolds and slots; an etched niobium separator frame devoid of manifolds and slots; two $O_2$ screen frames or electrode plates with manifolds and slots; an etched niobium $O_2$ screen frame with manifolds but no slots; an etched niobium $O_2$ membrane screen with manifolds but no slots; and a Group II grip sheet with manifolds but no slots;

a platinized NAFION® 117 membrane with appropriate electrodes attached;

a bipolar assembly made up of: a Group II grip sheet with manifolds but no slots; a 0.25 mm sintered zirconium powder porous sheet or plate; an etched niobium porous plate frame with manifolds but not slots; an etched niobium $H_2$ screen frame with manifolds but no slots; two etched niobium $H_2$ screen frames or electrode plates with manifolds and slots; an etched niobium separator frame with manifolds but no slots; a 0.51 mm sintered nickel felt compression pad; an etched niobium porous plate frame with manifolds but no slots; an etched niobium separator frame with manifolds but no Slots; two $O_2$ screen frames or electrode plates with manifolds and slots; an etched niobium $O_2$ screen frame with manifolds but no slots; an etched niobium $O_2$ membrane screen with manifolds but no slots; and a Group II grip sheet with manifolds but no slots;

a platinized NAFION® 117 membrane with appropriate electrodes attached;

a second bipolar assembly identical to the first;

a platinized NAFION® 117 membrane with appropriate electrodes attached;

a hydrogen end assembly made up of: a Group II grip sheet with manifolds but no slots; a 0.25 mm sintered zirconium powder porous sheet or plate; an etched niobium porous plate frame with manifolds but no slots; an etched niobium $H_2$ screen frame with manifolds but no slots; two etched niobium $H_2$ screen frames or electrode plates with manifolds and slots; an etched niobium separator frame with manifolds but no slots; a 0.33 mm sintered nickel felt compression pad; and an etched niobium porous plate frame with manifolds but no slots;

a support plate; and a fluid plate.

Prior to the assembly of the above-referenced test articles the active area of each etched metal part and the sintered metal powder membrane support structure was platinum plated to ensure minimal electrical contact resistance and then the STANDARD FLUOROELASTOMERIC COATING was applied to the sealing area of each part.

Once assembled, each test article was compressed between the end plate and fluid plate using tie rods located along the outside periphery of the cell assembly. The amount of compression was determined based on the load required to seal the membrane at the requisite operating pressure of the assembly.

Test Methods

Figure 3:
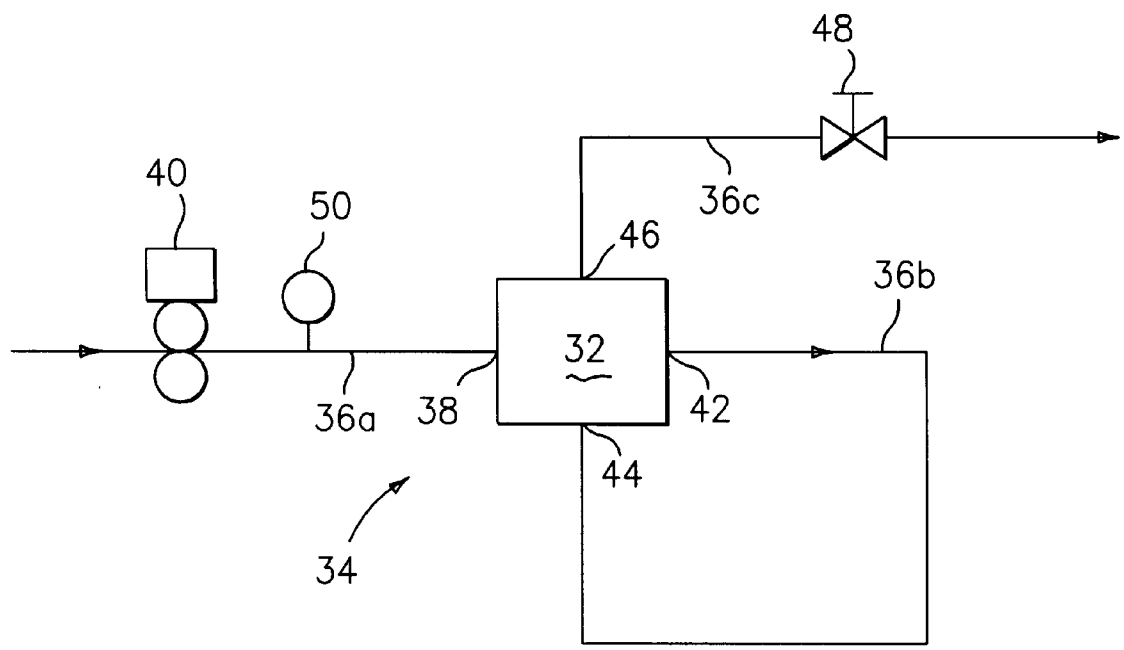
FIG. 3 is a fluid schematic of the Overboard Sealing Test testing assembly.

Group I grip sheets were subjected to the following tests:

Overboard Sealing Performance Test—Each assembled and compressed test article 32 was separately attached to a test set-up 34, as best shown in FIG. 3, and tested for sealing performance. In particular, high pressure flexible hoses 36a, b, c were attached within the test set-up 34 as follows: flexible hose 36a was attached to water inlet port 38 and to a hand-operated water pump 40; flexible hose 36b was attached to water-hydrogen outlet port 42 and to oxygen outlet port 44; and flexible hose 36c was attached to oxygen outlet port 46 and to a high-pressure valve 48.

For each test, high pressure valve 48 was opened and water was introduced through flexible hose 36a to the test article 32, by stroking water pump 40, until all of the air was removed from the test set-up 34. The high pressure valve 48 was then closed. The water pump 40 was then slowly stroked to increase pressure to the test article 32 in approximately 0.69 MPa increments until a water leak occurred at the grip sheet/membrane interface. A water pressure gauge 50 and the grip sheet/membrane interface of the test article 32 were visually monitored during each incremental increase in water pressure to the test article 32. A leak was indicated when the test article failed to maintain water pressure while the water pump 40 was stroked. Water droplets at the grip sheet/membrane interface were observed after each observed initial pressure decay.

Once a water leak occurred, the compression to the test article 32 was increased an additional 89,000 N and water pressure to the test article 32 again increased in approximately 0.69 MPa increments until a water leak occurred. This procedure was continued until a sealing pressure of 24.14 MPa was attained.

Figure 4:
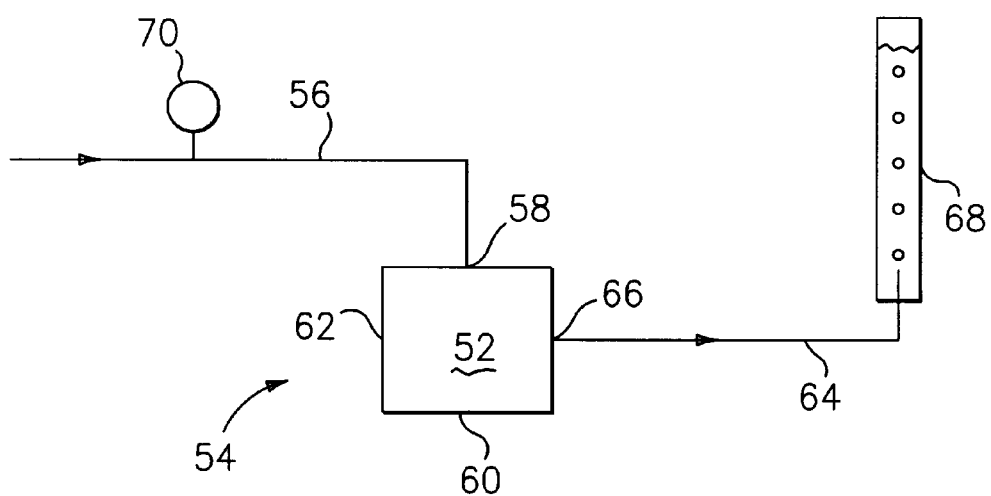
FIG. 4 is a fluid schematic of the Cross-Cell Sealing Test testing assembly.

Cross-Cell Sealing Test—Test articles 52, from the Overboard Sealing Performance Test, each employing one set of Group I grip sheets, were used, attached to a test set-up 54, as best shown in FIG. 4, and tested for cross-cell sealing capability. In particular, a high pressure nitrogen line 56 was attached to oxygen outlet port 58 of test article 52. Oxygen outlet port 60 and water-hydrogen outlet port 62 were then capped and one end of a flexible line 64 was attached to water inlet port 66 and the other end was placed under an inverted, water-filled burette 68.

For the Cross-Cell Sealing Test, the data obtained from the Overboard Sealing Performance Test was used to define the minimum compressive force necessary to effect the minimum performance requirement or an overboard seal of 14.5 MPa. In particular, in conducting the subject test the minimum compressive force was established at $3.0 \times 10^5$ N for the 0.05 mm screen grip; $3.6 \times 10^5$ N for the 0.075 mm screen grip; and $2.8 \times 10^5$ N for the 0.05 mm raised ridge grip. If the test article or cell did not pass the Cross-Cell Sealing Test, then the compressive force was increased slightly until the requisite pressure level was attained. In particular, the test article 52 was compressed to the minimum compressive force set forth above. The oxygen cavity of test article 52 was then slowly pressurized with nitrogen in approximately 2.8 MPa increments and a plot of diffusion rate versus pressure prepared. Cross-cell diffusion rate was determined by monitoring the amount of nitrogen gas collected in the inverted burette 68 for a given time. The pressure, as displayed on pressure gauge 70, was incrementally increased until a rapid rate of gas flow was observed or when the plot of diffusion rate versus pressure began to deviate from a straight line. This pressure was recorded as the cross-cell sealing pressure.

The test article 52 was then depressurized and the compression to the test article 52 increased an additional 44,500 N. The oxygen cavity of test article 52 was again slowly pressurized with nitrogen in approximately 2.8 MPa increments until a rapid rate of gas flow was observed or when the plot of diffusion rate versus pressure began to deviate from a straight line. This procedure was repeated until a cross-cell sealing capability of 24.14 MPa was attained.

The test articles employing Group II grip sheets were subjected to the following "check-out" tests: the Overboard Sealing Performance Test; the Cross-Cell Sealing Test; and the Electrical Integrity Test, as described below.

Electrical Integrity Test—The electrical integrity of each test article was verified by testing the capacitance of each single or multiple assembly. In particular, the ability of each test article to charge and maintain a charge was verified by attaching an electrical short test meter consisting of a 1.5 Vdc cell, a 0–3 Vdc analog meter and a double pole single throw switch, to the article. The electrical short test meter was attached to the test article by attaching a positive lead from the 1.5 Vdc cell to the positive terminal of the article and by attaching a negative lead from the 1.5 Vdc cell to the negative terminal of the article. The switch was then turned to the "on" position and the charging rate was observed and recorded. The switch was then turned to the "off" position and the potential decay was observed and recorded. The electrical integrity of the test article was verified when the article charged to approximately 1.0 Vdc in 1 minute and when the decay was slow and steady and did not drop below 0.3 Vdc in 1 minute.

Each test article was then placed "on test" to determine its lifetime or best endurance (limited by an electrical short).

EXAMPLES 1 TO 3

In these Examples, the test articles employing Group I grip sheets were subjected to the Overboard Sealing Performance Test and evaluated for sealing performance. The results are displayed in TABLE 1, set forth hereinbelow.

TABLE 1

SUMMARY OF EXAMPLES 1 TO 3
Water Pressure at Leakage (MPa)

| | Examples | | |
|---|---|---|---|
| | 1 | 2 | 3 |
| Hydraulic Load (N) | (0.05 mm thick, screen pattern) | (0.075 mm thick, screen pattern) | (0.05 mm thick, raised pattern) |
| 89,000 | 3.4 | 4.1 | — |
| 178,000 | 8.3 | 7.6 | — |
| 267,000 | 11.7 | 10.3 | 13.8 |
| 356,000 | 17.2 | 13.8 | 18.6 |
| 445,000 | 22.1 | 17.2 | 24.1 |
| 534,000 | >24.1 | 21.3 | >24.1 |

Examples 1 to 3 demonstrate that the grip sheets of the present invention, whether employing a screen pattern or a raised pattern, can each effect the minimum performance requirement or an overboard seal of 14.5 MPa at hydraulic loads of <365,000 N. Example 3 further demonstrates that grip sheets employing a concentric ridge raised pattern required less force to seal for any given hydraulic load as compared to the grip sheets of Examples 1 and 2 that employed screen patterns. As a result, the platinized membrane employed in the test article of Example 3 experienced reduced stress levels. Moreover, reduced membrane creep was observed in the test article of Example 3 which results in the test article or assembly demonstrating improved electrical integrity.

EXAMPLES 4 TO 5

In these Examples, the test articles employing Group I grip sheets were subjected to the Cross-Cell Sealing Test and evaluated for cross-cell sealing capability. Test articles employing 0.075 mm thick screen pattern grip sheets were not tested due to the increased likelihood of a short when used with a 0.17 mm thick membrane. The test results are displayed in TABLE II, set forth hereinbelow.

TABLE II

SUMMARY OF EXAMPLES 4 TO 5

| | Examples | |
|---|---|---|
| | 4 (0.05 mm thick, screen pattern) | 5 (0.05 mm thick, raised pattern) |
| hydraulic load (N) necessary to achieve cross-cell sealing pressure of 24.1 MPa | 534,000 | 498,400 |

Examples 4 and 5 demonstrate that 0.05 mm thick grip sheets, whether employing a screen pattern or a raised pattern, can each effect a sealing pressure of 24.1 MPa Examples 4 and 5 further demonstrate that 0.05 mm thick raised pattern grip sheets effect such a cross-cell sealing pressure at a reduced hydraulic load.

EXAMPLES 6 TO 9

In these Examples, the four test articles, each employing two Group II grip sheets, that successfully completed the requisite "checkout" tests (Overboard Sealing Performance Test, the Cross-Cell Sealing Test, and the Electrical Integrity Test) were tested for cell lifetime or endurance. The results are displayed in TABLE III, set forth hereinbelow.

TABLE III

SUMMARY OF EXAMPLES 6 TO 9

| Example | Grip Sheet/Coating(s) | Test Article No. | Cross-Cell Pressure (Mpa) | Best Endurance |
|---|---|---|---|---|
| 6 | 0.075 mm thick, screen pattern, SFC[1] | 1 (single cell) | 6.9[2] | Experienced electrical short after 555 hours of testing[3] |
| 7 | 0.05 mm thick, raised pattern, SFC | 2 (single cell) | 5.2[4] | Experienced electrical short after 1460 hours of testing |
| 8 | 0.05 mm thick, raised pattern, CC[5], SFC | 3 (two-cell) | 5.2[4] | Operated for >4900 hours without evidence of an electrical short |
| 9 | 0.05 mm thick, raised pattern, CC, SFC | 4 (three-cell) | 12.8[2] | Operated for >1200 hours without evidence of an electrical short |

[1]STANDARD FLUOROELASTOMERIC COATING
[2]Oxygen over ambient hydrogen
[3]Average of two test runs
[4]Hydrogen over ambient oxygen
[5]CATALYTIC COATING Examples 6 and 7 demonstrate that the use of grip sheets having raised patterns in a single cell assembly results in an increase in cell life. Moreover, Examples 7, 8 and 9 demonstrate that the use of raised pattern grip sheets coated with both the CATALYTIC COATING and the STANDARD FLUOROELASTOMERIC COATING in cell assemblies results in a significant increase in cell life.

Although this invention has been shown and described with respect to detailed embodiments thereof, it would be understood by those skilled in the art that various changes in form and detail may be made without departing from the spirit and scope of the claimed invention.

Having thus described the invention, what is claimed is:

1. An electrochemical cell that is operated at above-ambient pressures and that employs at least one ion-exchange membrane that creeps or flows under pressure, that comprises: at least two electrically non-conductive plate structures, wherein each said plate structure comprises: a first and a second surface; a central bore; at least one through aperture that opens onto said first and said second surfaces; a first border region on said first surface that surrounds said central bore; and a second border region on said first surface that defines an outside contour thereof, wherein said first surfaces of said plate structures are located on or contiguous to opposing sides of said membrane(s) and wherein said first surface of each said plate structure is provided with a means for impeding membrane creep or flow, such that, when said first surface of one such plate structure forcibly contacts a first surface of an ion-exchange membrane employed in said cell and when said first surface of a second such plate structure forcibly contacts an opposing surface of said membrane, said plate structures alone and collectively serve to contain, and thereby form a fluid tight seal with, said membrane.

2. The electrochemical cell of claim 1, wherein said impeding means of each said plate structure comprises a raised pattern that is contained on said first surface of each said plate structure.

3. The electrochemical cell of claim 2, wherein said raised pattern comprises a plurality of concentric ridges that separately surround said central bore and said aperture(s) of each said plate structure.

4. The electrochemical cell of claim 3, wherein said second border region of each said plate structure includes a plurality of concave regions, wherein said raised pattern further comprises: a plurality of radially oriented ridges located on said first border region; and a plurality of curved ridges located on said concave regions of said second border region.

5. The electrochemical cell of claim 3, wherein each said concentric ridge of said raised pattern has a height ranging from about 0.01 mm to about 0.04 mm and a width ranging from about 0.1 mm to about 0.4 mm and wherein each said ridge is located from about 0.1 mm to about 0.4 mm from adjacent ridges.

6. The electrochemical cell of claim 4, wherein each said radially oriented ridge and each said curved ridge of said raised pattern has a height ranging from about 0.01 mm to about 0.04 mm and a width ranging from about 0.1 mm to about 0.4 mm, and wherein each said ridge is located from about 0.1 mm to about 0.4 mm from adjacent ridges.

7. The electrochemical cell of claim 2, wherein each said plate structure has a thickness ranging from about 0.03 mm to about 0.2 mm.

8. The electrochemical cell of claim 1, wherein said impeding means of each said plate structure comprises a screen pattern that extends from said first surface to said second surface of each said plate structure.

9. The electrochemical cell of claim 8, wherein said screen pattern has a mesh size ranging from about 2 to about 6.

10. The electrochemical cell of claim 8, wherein each said plate structure has a thickness ranging from about 0.1 mm to about 0.4 mm.

11. The electrochemical cell of claim 1, wherein each said plate structure is prepared from a material selected from the group consisting of niobium, titanium, zirconium and stainless steel.

12. The electrochemical cell of claim 11, wherein each said plate structure further comprises an electrically non-conductive passivating layer.

13. The electrochemical cell of claim 1, wherein each said plate structure further comprises a first layer comprising a catalytic coating and a second outer layer comprising a fluoropolymer coating, wherein said catalytic coating comprises a cross-linking agent for said fluoropolymer of said fluoropolymer coating.

14. The electrochemical cell of claim 13, wherein said cross-linking agent of said catalytic coating is an organic silicone oligomer.

15. An electrically non-conductive plate structure, for use in electrochemical cells that are operated at above-ambient pressures and that employ ion-exchange membranes that creep or flow under pressure, that comprises:
- a first and a second surface;
- a central bore;
- at least one through aperture that opens onto said first and said second surfaces;
- a first border region on said first surface that surrounds said central bore;
- a second border region on said first surface that defines an outside contour thereof and that includes a plurality of concave regions; and
- a means for impeding membrane creep or flow that comprises a raised pattern that is contained on said first surface of said plate structure, wherein said raised pattern comprises:
  - a plurality of concentric ridges that separately surround said central bore and said aperture(s);
  - a plurality of radially oriented ridges located on said first border region; and
  - a plurality of curved ridges located on said concave regions of said second border region,
- wherein, when said first surface of one such plate structure forcibly contacts a first surface of an ion-exchange membrane employed in an electrochemical cell operated at above-ambient pressures and when said first surface of a second such plate structure forcibly contacts an opposing surface of said membrane, said plate structures alone and collectively serve to contain, and thereby form a fluid tight seal with, said membrane.

16. The plate structure of claim 15, wherein each said radially oriented ridge and each said curved ridge of said raised pattern has a height ranging from about 0.01 mm to about 0.04 mm and a width ranging from about 0.1 mm to about 0.4 mm, and wherein each said ridge is located from about 0.1 mm to about 0.4 mm from adjacent ridges.

17. The plate structure of claim 15, wherein said plate structure further comprises an electrically non-conductive passivating layer.

18. The plate structure of claim 15, wherein said plate structure further comprises a first layer comprising a catalytic coating and a second outer layer comprising a fluoropolymer coating, wherein said catalytic coating comprises a cross-linking agent for said fluoropolymer of said fluoropolymer coating.

19. The plate structure of claim 18, wherein said cross-linking agent of said catalytic coating is an organic silicone oligomer.

20. An electrically non-conductive plate structure, for use in electrochemical cells that are operated at above-ambient pressures and that employ ion-exchange membranes that creep or flow under pressure, that comprises: a first and a second surface; a central bore; and at least one through aperture that opens onto said first and said second surfaces,
- wherein said plate structure is provided with a means for impeding membrane creep or flow that comprises a screen pattern that extends from said first surface to said second surface of said plate structure,
- wherein, when said first surface of one such plate structure forcibly contacts a first surface of an ion-exchange membrane employed in an electrochemical cell operated at above-ambient pressures and when said first surface of a second such plate structure forcibly contacts an opposing surface of said membrane, said plate structures alone and collectively serve to contain, and thereby form a fluid tight seal with, said membrane.

21. The plate structure of claim 20, wherein said screen pattern has a mesh size ranging from about 2 to about 6.

22. The plate structure of claim 20, wherein said plate structure has a thickness ranging from about 0.1 mm to about 0.4 mm.

23. An electrochemical cell that is operated at above-ambient pressures and that employs at least one ion-exchange membrane that creeps or flows under pressure, that comprises: at least two electrically non-conductive plate structures, wherein each said plate structure comprises:
- a first and a second surface;
- a central bore;
- at least one through aperture that opens onto said first and said second surfaces;
- a first border region on said first surface that surrounds said central bore;
- a second border region on said first surface that defines an outside contour thereof and that includes a plurality of concave regions; and
- a means for impeding membrane creep or flow that comprises a raised pattern that is contained on said first surface of said plate structure, wherein said raised pattern comprises:
  - a plurality of concentric ridges that separately surround said central bore and said aperture(s) of said plate structure;
  - a plurality of radially oriented ridges located on said first border region; and
  - a plurality of curved ridges located on said concave regions of said second border region,
- wherein, when said first surface of one such plate structure forcibly contacts a first surface of an ion-exchange membrane employed in said cell and when said first surface of a second such plate structure forcibly contacts an opposing surface of said membrane, said plate structures alone and collectively serve to contain, and thereby form a fluid tight seal with, said membrane.

24. An electrochemical cell that is operated at above-ambient pressures and that employs at least one ion-exchange membrane that creeps or flows under pressure, that comprises: at least two electrically non-conductive plate structures, wherein each said plate structure comprises: a first and a second surface; a central bore; and at least one through aperture that opens onto said first and said second surfaces,
- wherein each said plate structure is provided with a means for impeding membrane creep or flow that comprises a screen pattern that extends from said first surface to said second surface of each said plate structure,
- wherein, when said first surface of one such plate structure forcibly contacts a first surface of an ion-exchange membrane employed in said cell and when said first surface of a second such plate structure forcibly contacts an opposing surface of said membrane, said plate structures alone and collectively serve to contain, and thereby form a fluid tight seal with, said membrane.

25. An electrically non-conductive plate structure, for use in electrochemical cells operated at above-ambient pressures and employing ion-exchange membranes that creep or flow under pressure, that comprises: a first and a second surface; a central bore; at least one through aperture that opens onto said first and said second surfaces; a first border region on said first surface that surrounds said central bore; and a second border region on said first surface that defines an outside contour thereof, wherein said plate structure is provided with a means for impeding membrane creep or flow, such that, when said first surface of one such plate structure forcibly contacts a first surface of an ion-exchange membrane employed in an electrochemical cell operated at above-ambient pressures and when said first surface of a second such plate structure forcibly contacts a second surface of said membrane, said plate structures alone and collectively serve to contain, and thereby form a fluid tight seal with, said membrane.

* * * * *

UNITED STATES PATENT AND TRADEMARK OFFICE
CERTIFICATE OF CORRECTION

PATENT NO. : 6,037,075
DATED : March 14, 2000
INVENTOR(S) : KURT M. CRITZ ET AL.

It is certified that error appears in the above-indentified patent and that said Letters Patent is hereby corrected as shown below:

In the listing of Attorney, Agent, or Firm, change "Mark" to --Mary--.

Column 6, line 65 of the Patent, change referenced number "14" to appear in bold print --14--.

Column 12, line 9 of the Patent, change "Slots" to --slots--.

Column 14, line 46 of the Patent, change "<365,000 N" to --≤365,000 N--.

Signed and Sealed this

Third Day of April, 2001

Attest:

NICHOLAS P. GODICI

*Attesting Officer*       Acting Director of the United States Patent and Trademark Office